United States Patent [19]

Cohen et al.

[11] 4,229,547

[45] Oct. 21, 1980

[54] METHOD OF PREPARING SPHERICAL POROUS BEAD-TYPE POLYMERS

[75] Inventors: Louis Cohen, Avon Lake; Pijus K. Basu, Brecksville, both of Ohio

[73] Assignee: The B. F. Goodrich Company, Akron, Ohio

[21] Appl. No.: 21,399

[22] Filed: Mar. 19, 1979

[51] Int. Cl.² .............................. C08F 2/20; C08J 9/00
[52] U.S. Cl. ............................... 521/69; 260/29.6 R; 260/29.6 RB; 260/29.6 XA; 260/29.6 T; 521/145; 521/56; 526/201; 526/202; 526/203; 526/207; 526/208; 526/209; 526/217
[58] Field of Search .............. 526/201, 202, 216, 203, 526/209, 213, 214, 215, 344.2, 910, 911; 260/29.6 R, 29.6 XA, 29.6 RB, 29.6 T; 521/69, 145

[56] References Cited

U.S. PATENT DOCUMENTS

| | | | |
|---|---|---|---|
| 3,228,919 | 1/1966 | Gatta et al. | 526/202 |
| 3,340,243 | 9/1967 | Beer et al. | 526/202 |
| 3,423,352 | 1/1969 | Levine et al. | 526/911 |
| 3,620,988 | 11/1971 | Cohen | 526/202 |
| 3,706,722 | 12/1972 | Nelson et al. | 526/216 |
| 3,907,730 | 9/1975 | Jones | 526/230.5 |

Primary Examiner—John Kight, III
Attorney, Agent, or Firm—Roy P. Wymbs

[57] ABSTRACT

This invention relates to a new and improved quiescent polymerization process which produces spherical beads of polymer having excellent porosity and unusually high bulk density. The process comprises polymerizing discrete droplets of liquid monomer containing a monomer-soluble free radical type catalyst while suspended in an aqueous mucilage having plastic flow properties and in the presence of a nonionic surfactant having the proper Hydrophile-Lipophile Balance (HLB), such as, for example, sorbitan monooleate. The porous bead polymers have the advantage of providing for lower cost bulk shipping, better extrusion feed, and for easy monomer stripping.

24 Claims, 3 Drawing Figures

QUIESCENT CONTROL

SUSPENSION PVC

QUIESCENT + HLB 1-17

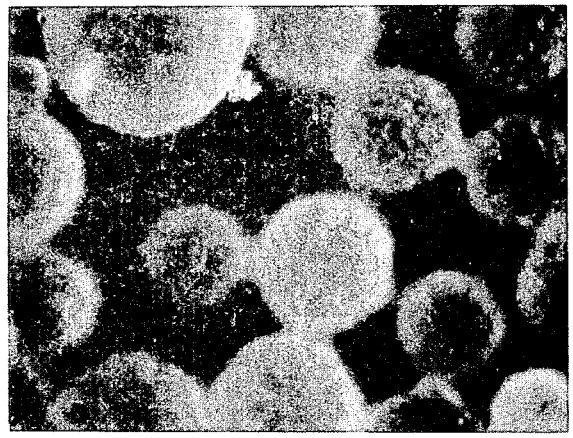
FIG. 1. QUIESCENT CONTROL
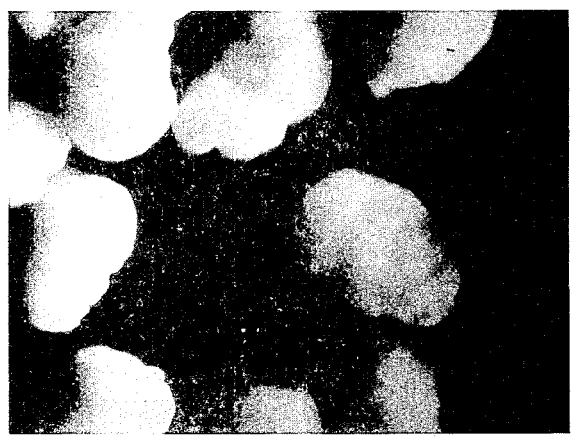
FIG. 2. SUSPENSION PVC
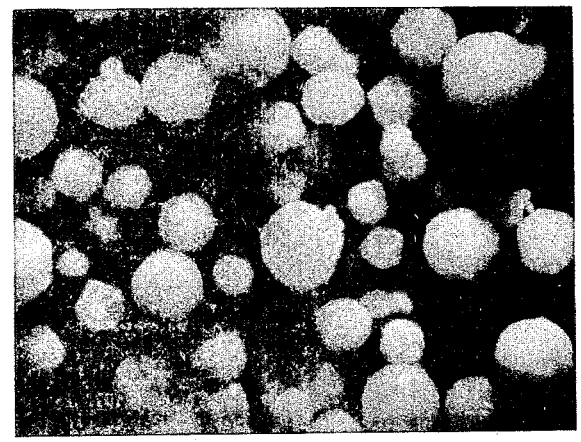
FIG. 3. QUIESCENT + HLB 1-17

METHOD OF PREPARING SPHERICAL POROUS BEAD-TYPE POLYMERS

BACKGROUND OF THE INVENTION

Commercially today, many monomeric materials, and particularly vinyl chloride, are being polymerized on a large scale either in aqueous suspension or in aqueous dispersion, i.e., latex foam, employing colloidal suspension agents or soaps and/or synthetic detergent-type dispersing agents. In these methods of polymerization, moderate to vigorous agitation is depended on to suspend and/or disperse, and to maintain such suspension or dispersion, during polymerization and to assist heat transfer to reactor cooling surfaces. However, polymer particles produced in accordance with these processes are not uniform in size and shape. In processing such polymers as, for example, polyvinyl chloride (PVC), it is desirable, and very often necessary, to have uniform size and shape in the polymer particles.

Various methods and modifications of existing processes have been proposed to obtain uniform polymer particle size. For example, one very successful method proposed is that described in U.S. Pat. No. 3,620,988. In this process a monomeric material, such as vinyl chloride, of low solubility in water containing a monomer-soluble free radical type catalyst, is suspended as discrete droplets of a desired size in an aqueous medium thickened with a water-insoluble highly gelled polymeric suspending or dispersing agent which imparts plastic flow properties to such medium. The polymerization reaction is then carried out using a batch or continuous process under substantially quiescent conditions, that is, in the absence of turbulence or the absence of shearing forces sufficient to deform the suspended droplets or monomer and/or to damage the polymer bead at any stage of conversion. When polymerizing vinyl chloride by such a process, the uniform beads of PVC that are formed are normally clear and glassy in nature.

There are many cases where porous polymer beads are desirable, such as where the polymer, such as PVC, is to be employed in extrusion operations. Porous beads would also be desirable in the case of PVC where, because of Government regulations, it is necessary to remove substantially all the unreacted vinyl chloride therefrom. A porous polymer bead would greatly facilitate such removal.

SUMMARY OF THE INVENTION

We have unexpectedly found that highly porous and spherical polymer beads of uniform size and shape can be formed by incorporating in the monomer to be polymerized a non-ionic surfactant, such as, for example, sorbitan monooleate. In addition to the surfactant, a monomer-soluble free radical type catalyst is also incorporated in the monomer and said monomer mixture is then suspended as discrete droplets of a desired size in an aqueous medium thickened with a water-insoluble highly gelled polymeric suspending or dispersing agent which imparts plastic flow properties to such medium. Thereafter, the polymerization of the monomer is carried out batchwise or continuously under substantially quiescent conditions using heat and pressure. The reaction medium remains quite mobile at all stages of the process and even at solids levels of 25 to 40% or more. The character of flow of the reaction medium is not more violent than plastic or laminar flow.

DETAILED DESCRIPTION

In the practice of the process of the instant invention, the water-insoluble suspending or dispersing agents employed are essentially completely gelled out when added to an aqueous medium. They swell very greatly until the aqueous phase becomes a continuous non-grainy gel phase evidencing plastic flow behavior wherein the medium evidences a minimum critical yield value, or finite shear stress at zero shear rate, sufficient to maintain the monomer droplets frozen in permanent suspension, as shown and described in U.S. Pat. No. 3,620,988. Such polymerization media are not unduly viscous at low shear rates encountered in plastic or laminar flow and many are no more viscous at low or moderate shear rates than, for example, pure glycerine. Even though such polymerization media do not separate on standing, they are easily separable into polymer solids and aqueous phase by simple screening, centrifuging, and the like.

The synthetic resins or polymers employed as suspending or dispersing agents in the polymerization medium of the present invention are the lightly crosslinked interpolymers of one or more carboxylic acid monomers with a polyunsaturated compound having a plurality of terminally unsaturated polymerizable groups. The carboxylic acid monomer utilizable in preparing the polymeric suspending agents of the present invention are those which contain at least one active carbon-to-carbon double bond in the $\alpha,\beta$-position with respect to a carboxyl group thusly

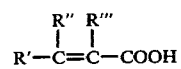

(1)

wherein R' is hydrogen or a —COOH group, and each of R" and R''' is a hydrogen or a monovalent substituent group which is linked to one of the doubly bonded carbon atoms. Carboxylic acids within this definition include acids such as acrylic acid wherein the double bond is terminal thusly

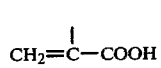

(2)

or the dicarboxylic acids such as maleic acid and other anhydrides of the general structure

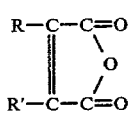

(3)

wherein R and R' are monovalent substitutent groups and especially those selected from the group consisting of hydrogen, halogen and cyanogen (—C≡N) groups and alkyl, aryl, alkaryl, aralkyl and cycloaliphatic radicals.

Included within the class of carboxylic acids, shown by generic formula (1) above, are widely divergent materials such as the acrylic acids, such as acrylic acid itself, methacrylic acid, ethacrylic acid, $\alpha$- and $\beta$-chloro, bromo-, and cyanoacrylic acids, crotonic acid, $\beta$-acryloxy propionic acid, $\alpha,\beta$-isopropylidene propionic acid, cinnamic acid, maleic acid, fumaric acid, itaconic acid, and many others.

Polymerizable carboxylic anhydrides include any of the anhydrides of the above acids, including mixed anhydrides, and those shown by generic formula (3) above, including maleic anhydride and others. In many cases it is preferred to copolymerize an anhydride monomer with a comonomer, such as methyl vinyl ether, styrene, and the like.

In the present invention it is preferred to employ polymeric suspension agents derived from polymers produced by the polymerization of the $\alpha,\beta$-monoolefinically unsaturated carboxylic acids. The more preferred carboxylic acids are those derived from the acrylic acids and $\alpha$-substituted acrylic acids having the general formula

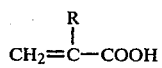

$$CH_2=C-COOH \qquad (4)$$

wherein R is a monovalent substituent selected from the group consisting of hydrogen, halogen, hydroxyl, carboxyl, amide, ester, lactone, lactam, and cyanogen groups.

The most preferred polymeric suspending agents are those prepared from the lightly cross-linked interpolymers of acrylic acid. These suspending agents are the most efficient and have the most desirable viscosity characteristics, viscosity stability and suspending ability.

The cross-linking agents which may be employed with any of the above-named carboxylic monomers, or mixtures thereof, may be any compound, not necessarily monomeric in nature, containing a plurality, that is two or more, of terminal polymerizable $CH_2=C<$ groups per molecule. Examples of this class of material include polyunsaturated-hydrocarbons, -polyethers, -polyesters, -nitriles, -acids, -acid anhydrides, -ketones, -alcohols and polyunsaturated compounds of this class incorporating one or more of these and other functional groups. Specifically, there may be utilized divinyl benzene, divinyl naphthalene, low molecular weight and soluble polymerized dienes, such as polybutadiene and other soluble homopolymers of open chain aliphatic conjugated dienes, which soluble polymers do not contain any appreciable number of conjugated double bonds, and other polyunsaturated hydrocarbons; polyunsaturated esters, ester-amides and other ester derivatives, such as ethylene-glycol diacrylate, ethylene-glycol dimethacrylate, allyl acrylate, methylene bisacrylamide, methylene bismethacrylamide, triacrylyl triazine, hexallyl trimethylene trisulfone, and many others; polyunsaturated ethers, such as divinyl ether, diallyl ether, dimethyl allyl ether, diallyl ethylene glycol ether, diallyl, triallyl and other polyallyl ethers of glycerol, butene-1,2-diol, 1-phenyl-1,2,3-propanetriol, the polyallyl, -vinyl and -crotyl polyethers containing from two to seven or more of these or other alkenyl ether groupings per molecule and made from polyhydric alcohols such as the carbohydrate sugars, and the so-called "sugar alcohols" including erythritol, pentaerythritol, arabitol, iditol, mannitol, sorbital, inositol, raffinose, glucose, sucrose, and many others, and other polyhydroxy carbohydrate derivatives, the corresponding polyalkenyl silanes, such as the vinyl and allyl silanes; and others. Of this large class the polyalkenyl polyethers of the carbohydrate sugars, sugar alcohols and other polyhydroxy carbohydrate type derivatives containing from two to seven alkenyl ether groups per molecule are particularly useful. Such materials are easily prepared by a Williamson-type synthesis involving the reaction of an alkenyl halide, such as allyl chloride, allyl bromide, methallyl chloride, crotyl chloride, and the like, with a strongly alkaline solution of one or more of the polyhydroxy carbohydrate derivatives. Cross-linking agents of this class produce essentially completely gelled, cross-linked carboxylic polymers which retain their rheological efficiency during neutralization and during service, have the ability to swell most highly and produce smooth, creamy and nongrainy mucilaginous compositions of the greatest suspending efficiency.

As little as about 0.02 to about 0.05% by weight, based on the weight of the mucilage, of the suspending or dispersion agents are capable of imparting the desired yield values for permanent suspension. However, one can employ from about 0.05% to about 2.0% or more by weight of such agents. Preferably, from about 0.05% to about 0.50% by weight of the agent is used. In general, the polymeric suspending or dispersing agents swell most highly in water at a pH of from about 4 to about 8 and this range is a good one for good polymerization rates with many monomers. This pH range is obtained by neutralizing from about 15 to about 85 mol percent, and usually from about 20 to about 40 mol percent, of the carboxyl content present in the acid-form agent.

While products obtained by neutralizing or partially neutralizing the carboxyl content of the suspending agent with only ordinary monovalent alkalis, such as sodium hydroxide, potassium hydroxide, ammonia, and the like, may be used, the acid-form of unneutralized polymer and the alkali/amine dual-salts of the same polymer are particularly useful. The acid-form polymer is less efficient than the dual-salts and is employed in higher concentrations. Such dual-salts are prepared employing two or more neutralizing agents including at least one neutralizer from each of the following two classes:

1. Monovalent alkaline materials including ammonia and the alkali metal hydroxides, oxides, carbonates, and the like.
2. Basic organic long chain amines containing at least 6 carbon atoms, and preferably between about 10 and about 30 carbon atoms, per molecule.

These neutralizers are shown and described in U.S. Pat. No. 3,620,988, issued Nov. 16, 1971, which is incorporated herein by reference.

In the monomeric mixture, for making the synthetic resins or polymers employed as suspending or dispersing agents in the present invention, the two essential monomeric materials should be present in certain proportions, although the exact proportions will vary considerably depending on the characteristics desired in the polymer. Small amounts of the polyalkenyl polyether copolymerize quite readily with carboxylic monomers and the cross-linking effect of the polyalkenyl polyether on the carboxylic monomer is so strong that as little as 0.1% by weight thereof, based on the total mixture, produces a great reduction in the water- and solvent-solubility of the polymer. When 0.1 to 4.0%, more preferably 0.20 to 2.5% by weight of the polyether, is utilized water-insoluble polymers are obtained, especially with acrylic acids, which are extremely water-sensitive, especially in the form of their monovalent salts, and swell greatly with the absorption of hundreds of times their own weight of water. When 0.1 to 6.0%, more preferably 0.20 to 5.0% of the polyether is copolymerized with maleic anhydride high-swelling polymers also are obtained. In the dual copolymer or two-component interpolymer, this means that the remainder of the monomeric mixture will be the carboxylic monomer. Other proportions may be utilized to produce polymers of various new and useful properties.

The monomeric proportions to be employed in the production of multi-component interpolymers may vary in a somewhat similar manner. However, since the swelling capacity (or swelling index) of the low-level cross-linked polymers is dependent on the carboxylic content of the polymer, it is generally desirable to utilize as much of the carboxylic monomer or monomers and as little of the other monomeric constituents as is consistent with the necessary water-insolubility and other desirable properties. In these interpolymers, therefore, the carboxylic monomer or monomers should never be less than 25%, and preferably not less than 40%, by weight of the total monomeric mixture. Multi-component interpolymers may be made from monomeric mixtures comprising from 25 to 95% of a carboxylic monomer, such as acrylic acid, 0.1 to 30% of a polyalkenyl polyether, such as a polyallyl polyether of sucrose, and 5.0 to 74.9% of an additional monomer or monomers. Preferred for use as water-swellable artificial gums are tripolymers resulting from the polymerization of monomeric mixtures containing, respectively, from 40 to 95% by weight of acrylic acid, 0.20 to 2.5% by weight of polyallyl polyether, such as that of sucrose, and 4 to 59% of an additional monomer or monomers, such as maleic anhydride, N-methyl acrylamide, methyl vinyl ether, ethyl vinyl ether, n-butyl vinyl ether, and the like and mixtures of maleic anhydride, a vinyl alkyl ether, such as vinyl methyl ether, and a polyallyl polyether, in which the sum of the moles of vinyl ether and polyallyl polyether is substantially equivalent to the molar quantity of maleic anhydride present. It is to be understood that in the above proportions, if a maximum amount of two of the monomers are utilized, that somewhat less than maximum amounts of the other monomers must be utilized.

Suitable for use as additional monomers in the production of multi-component interpolymers, as above described, are monoolefinic vinylidene monomers containing one terminal $CH_2=C<$ group such as styrene, the chloro- and ethoxy-styrenes, etc., acrylamide, N-methylacrylamide, N,N-dimethyl acrylamide, acrylonitrile, methacrylonitrile, methyl acrylate, ethyl acrylate, 2-ethylhexylacrylate, methyl methacrylate, vinyl acetate, vinyl benzoate, vinyl pyridine, vinyl chloride, vinylidene chloride, vinylidene chlorobromide, vinyl carbazole, vinyl pyrrolidone, methyl vinyl ether, ethyl vinyl ether, n-butyl vinyl ether, methyl vinyl ketone, polyethylene, isobutylene, dimethyl maleate, diethyl maleate, and many others. In addition to the above monoolefinic monomers, many of the divinyl dialkenyl or others polyfunctional esters, amides, ethers, ketones, and the like may be utilized in the production of multi-component interpolymers, especially those polyfunctional monomers which nominally function as cross-linking or insolubilizing monomers but which are easily saponified and hydrolyzed to to additional hydroxyl, carboxyl and other hydrophilic groups. For example, an interpolymer of acrylic acid and divinyl ether is insoluble in water but upon standing gradually goes into solution probably due to hydrolysis and breaking of divinyl ether crosslinks. The presence of strong alkali or acid speeds dissolution. Spectroscopic analysis confirms the presence in the polymer of non-carboxylic hydroxyls. Similarly, diesters such as diallyl maleate, ethylene glycol dimethacrylate, acrylic anhydride, beta-allyloxy acrylate and many others are readily saponified or hydrolyzed by alkali or acid with the introduction of additional hydroxyl and/or carboxyl groups. Of the above additional monomers N-methyl acrylamide, methyl vinyl ether, ethyl vinyl ether and divinyl ether have been found useful for the production of the water-swellable, gum-like polymers.

With respect to additional monomers, reference should be had to U.S. Pat. No. 2,798,053, issued July 2, 1957, which is incorporated herein by reference.

The improvement of the present invention is in the use of a nonionic surfactant or surface active agent to impart high porosity to the substantially uniform spherical beads of polymer. Nonionic surfactants' emulsifying efficiency is related to the polarity of the molecule, that is, the relation between the contribution of the polar hydrophilic head and the nonpolar lipophilic tail. This polarity for nonionic surfactants is defined in terms of an empirical quantity which is called the hydrophile-lipophile balance or HLB. The HLB is explained and the method of determining the same is set out in "Nonionic Surfactants" edited by Martin J. Shick at pages 604–612, published in 1967 by Marcel Dekker, Inc., New York. For the purposes of the present invention, a nonionic surfactant having an HLB in the range of about 1.0 to about 17.0 is satisfactory. Excellent results have been obtained with an HLB in the range of about 2.0 to about 6.0 to obtain spherical, smooth and porous beads of polymer. A very satisfactory range of HLB is from about 1 to about 10 which produces a most desirable porosity in the spherical polymer particles. The nonionic surfactants having an HLB in the range of about 1 to about 10 are classified as oil-soluble or monomer-soluble. As the HLB of the nonionic surfactant is increased, it becomes more water-soluble, that is, surfactants with an HLB in the range of about 10 to about 17 are more soluble in the water phase than in the oil phase of the reaction medium. However, irrespective of the solubility, the superior results of the present invention are obtained with all the nonionic surfactants having an HLB in the range of about 1 to about 17.

The surfactant is normally mixed with the monomer or monomers to be polymerized prior to being formed into discrete droplets in the aqueous mucilage. The nonionic surfactants useful for the purposes of the invention are those falling within the following generic classes and having an HLB in the broad range given above: (1) polyoxyethylene alkylphenols; (2) polyoxyethylene alcohols; (3) polyoxyethylene esters of fatty acids; (4) polyoxyethylene alkylamines; (5) polyoxyethylene alkylamides; (6) polyol surfactants including polyglycerol esters; and (7) poly-alkylene oxide block copolymers. As examples of surfactants in the above classes having the appropriate HLB there may be named the following: sorbitan trioleate; sorbitan tristearate; polyoxyethylene sorbitol hexastearate; lactylated mono- and diglycerides of fat-forming fatty acids, ethylene glycol fatty acid ester; mono- and diglycerides of fat-forming fatty acids; mono- and diglycerides from the glycerolysis of edible fats; propylene glycol fatty acid ester; propylene glycol monostearate; sorbitan sesquioleate; polyoxyethylene sorbitol 4.5 oleate; glycerol monostearate; decaglyceryl tetraoleate; triglyceryl monooleate; sorbitan monooleate; sorbitan partial fatty esters; high-molecular-weight fatty amine blend; sorbitan monostearate; diethylene glycol fatty acid ester; polyoxyethylene (2) stearyl ether; polyoxyethylene (2) oleyl ether; polyoxyethylene sorbitol beeswax derivative; polyoxyethylene (2) cetyl ether; diethylene glycol monolaurate (soap-free); sorbitan monopalmitate; high-molecular-weight amine blend; sorbitan monooleate polyoxyethylene ester mixed fatty and resin acids blend; polyoxypropylene mannitol dioleate; polyoxyethylene sorbitol lanolin derivative; sorbitan monolaurate; polyoxyethylene sorbitol esters of mixed fatty and resin acids; polyoxyethylene fatty acid; polyoxyethylene sorbitol oleate; polyoxyethylene sorbitan monostearate; polyoxyethylene sorbitol tallow esters; polyoxyethylene sorbitol tall oil; polyoxyethylene lauryl ether; polyoxyethylene sorbitan monooleate; polyoxyethylene sorbitol hexaoleate; polyoxyethylene sorbitan tristearate; and polyoxyethylene sorbitan trioleate.

The above compounds have a multiplicity of functional groups and accordingly, a very large number of modifications is possible. Mixtures of said compounds can also be used, for example, mixtures of sorbitan monooleate and sorbitan trioleate. Usually the amount of nonionic surfactant employed will be in the range of about 0.005% to about 2.0% by weight, based on the weight of the monomer or monomers to be polymerized. Preferably, an amount of surfactant in the range of 0.05% to 0.6% by weight is employed.

Reference is made to the drawing which shows three photomicrographs identified as follows:

FIG. 1 shows glassy bead particles of PVC made by the standard quiescent polymerization process;

FIG. 2 shows the irregular particles of PVC obtained using the known aqueous suspension polymerization process; and FIG. 3 shows the spherical and highly porous PVC particles obtained using the process of the present invention.

All three photomicrographs were taken at a magnification of 120×. The improved PVC particles obtained by the present process is readily apparent when comparing the figures of the drawing. The porous and spherical particles, obtained by the present invention, as shown in FIG. 3, gives much better particle packing, higher bulk density, better powder flow and extrusion feed. This can be seen from the following data:

so that said gel phase exhibits sufficient "yield value", as described hereinafter, to immobilize the droplets of monomer(s) that are to be polymerized. The viscosity of the muscilage or polymerization medium can be regulated by adjusting the amount of suspending or dispersing agent added to the water.

The amount of suspending agent or thickener required for proper yield value is easily determined. The minimum yield value required in the aqueous medium for suspension stability with any given monomeric material depends on (a) the density difference between the monomeric and aqueous phases, labeled $D-D_o$ and expressed as grams/cm$^3$; (b) on the desired or actual radius (R) of the suspended monomer droplet, expressed in cm.; and (c) the acceleration of gravity (g) expressed in cm./sec.$^2$, usually 980 cm./sec.$^2$. The minimum Brookfield Yield Value (BYV) for permanent suspension can be calculated by the formula:

$$BYV = [25.6R(D-D_o)g]^{\frac{1}{2}} \tag{I}$$

wherein the terms are as identified above. This equation is valid only for the materials widening plastic flow properties as described herein.

In practice, it is desirable to employ aqueous media having a BYV in excess of the calculated minimum in order to make certain that suspension stability is easily achieved and is fully maintained throughout the reaction. It is satisfactory to employ aqueous mucilagenous media having a measured or actual BYV at least 25% and preferably from about 50% to about 200% or more higher than the calculated minimum.

Actualy BYV values are measured or calculated from rheological data obtained by the use of the Brookfield RVT Viscometer, operated at the temperature to be utilized in the polymerization, whereby one measures the Brookfield apparent viscosity (BAV) in centipoises at 0.5 rpm. and at 1.0 rpm. If these data are plotted against shear rate and the curve extrapolated to zero shear rate, the BYV is obtained directly. However, the minimum BYV for permanent stability can be approximated from the formula:

$$\text{Approx. } BYV = \frac{BAV @ 0.5 \text{ rpm.} - BAV @ 1.0 \text{ rpm.}}{100} \tag{II}$$

In many cases, a useful and easily measured and cal-

| Polymer | Apparent Bulk Density (gm/cc.) | Compacted Bulk Density (gm/cc.) | Corrected Packing Fraction (cc/cc.) | Funnel Flow Time (Seconds) | Porosity (cc/gm.) | Vinyl Chloride Removal |
|---|---|---|---|---|---|---|
| FIG. 1 - Glassy Beads | 0.659 | 0.715 | 0.532 | — | Nil. | Very slow |
| FIG. 2 - Suspension PVC | 0.491 | 0.577 | 0.556 | 23.8 | 0.22 | Medium to fast |
| FIG. 3 - Present Invention | 0.668 | 0.755 | 0.690 | 14.8 | 0.20 | Very fast |

The mucilage or mucilaginous composition may be prepared by adding the polymeric suspending agent to the appropriate amount of water to be employed in the subsequent polymerization reaction. The suspending agent swells such that the aqueous phase becomes a non-grainy gel phase. The gel phase is then partially neutralized by the addition of a water-soluble base in order to adjust the pH in a range of about 4 to about 8 culated viscometric parameter is the ratio (R') of the BYV divided by the apparent Brookfield viscosity measured at 20 rpm. This ratio will vary somewhat depending on the magnitude of BYV. The formula (I) above incorporates an empirical correction factor which compensates for this error. The media exhibiting the larger R' value will permit the desired suspension stabilizers with the greatest fluidities.

In general, BYV values with the suspending agents of this invention will be, at a minimum, in the range of about 50 to about 75 for the usual monomers and particle sizes. Most often with many of the usual monomers the practical operating range will be from about 75 to about 250. The Brookfield apparent viscosity at 20 rpm. of media of such BYV will be in the range of about 1,000 to about 2,000 centipoises.

After preparation of the polymerization medium or mucilaginous composition, the liquid monomer to be polymerized, such as vinyl chloride for example, may be mixed with the appropriate amount of oil-soluble catalyst and surfactant, as described above. Normally this mixing is conducted at a temperature below that at which the particular catalyst being used becomes active.

Typical monomer-soluble or oil-soluble catalysts that may be used in the polymerization process of the present invention are the alkanoyl, aroyl, alkaroyl and aralkanoyl diperoxides and monohydroperoxides, azo compounds, peroxy esters, percarbonates, and other free radical type catalysts. As examples of such catalysts, there may be named benzoyl peroxide, lauryl peroxide, diacetyl peroxide, cumene hydroperoxides, methyl ethyl ketone peroxide, diisopropylbenzene hydroperoxide, 2,4-dichlorobenzoyl peroxide, naphthoyl peroxide, t-butyl perbenzoate, di-ti-butyl perphthalate, isopropyl percarbonate, acetyl cyclohexane sulfonyl peroxide, di-secondary butyl peroxydicarbonate, t-butyl peroxyneodecanoate, di-normal propyl peroxydicarbonate, azo-bisisobutyronitrile, $\alpha,\alpha'$-azodiisobutyrate, 2,2'-azobis(2,4-dimethyl valeronitrile), and many others. The particular free radical catalyst employed will depend upon the monomeric material(s) being polymerized, the molecular weight and color requirements of the polymer, the temperature of polymerization, etc.

After the preparation of the mucilaginous composition and the mixture of monomer, catalyst and surfactant or surface active agent, the two are combined and intermixed to break up the continuous monomer phase into droplets of the desired size. When the monomer to be polymerized is volatile, the intermixing should be carried out in a closed vessel, with our without an inert atmosphere over the mixing liquids. A completely filled vessel approach may also be utilized.

The mixture of mucilaginous composition and the monomer composition is agitated with an intensity selected or varied to yield the desired monomer droplet size. Droplet size is inversely related to shear rate during this operation. With any given combination of monomer and mucilage, the requisite degree of agitation for a given droplet size can be determined experimentally by trial-and error but this is not difficult due to the pronounced tendency of an organic liquid of ordinary viscosity to break up into droplets in such a medium as the mucilage described herein. One can obtain a rough measure of the required intensity of agitation by placing the correct or desired proportions of mucilage and monomer in a stoppered test tube and count the number of inversions of the test tube required to suspend the monomer in the mucilage. With many of the common or well known monomers, 30 or 40 inversions of the test tube at the rate of 30 inversions per minute will produce suspensions of relatively large droplets, that is, on the order of 1 to 3 mm. in diameter. Finer droplet sizes can be achieved with many common mixing devices and/or homogenizer-type equipment well known to those skilled in the art. In large scale repetitive commercial operations, procedures for obtaining the desired droplet size can be prepared in terms of the mixer or agitator type, agitation rate, agitation time and temperature.

The polymerization process of the present invention may be carried out at any temperature which is normal for the monomeric material to be polymerized. Normally, a temperature in the range of about 0° C. to about 150° C. will polymerize most known mono-unsaturated monomeric materials. Preferably, a temperature in the range of about 25° C. to about 100° C. is employed. In order to facilitate temperature control under the relatively quiescent conditions of the herein polymerization process, the reaction medium is brought into contact with cooling surfaces cooled by water, brine, evaporation, etc. A jacketed polymerization reactor is suitable wherein the cooling material is circulated through the jacket throughout the polymerization reaction.

The monomeric material to be polymerized in accordance with this invention to produce highly porous spherical beads is limited only by the requirement that the polymer to be produced be insoluble in the monomer or monomers from which it is made. However, many of the useful monomers will be those which have a solubility of less than about 5% by weight in water. Of course, the catalyst must be one capable of mass-polymerizing the monomer or monomers in question. Among the monounsaturated monomers which may be used in the present invention there may be named, as examples, vinyl chloride, vinyl bromide, vinyl fluoride, vinylidene chloride, tetrafluoroethylene, styrene and nuclear substituted styrenes, alkyl acrylates, alkyl alkacrylates such as methyl methacrylate, acrylonitrile, ethyl vinyl benzene, vinyl naphthalene, and the like, as well as mixtures of any two or more of these monomers and/or with still other similar monomers, butadiene, and the like. In some cases, very minor proportions, for example, up to 1 or 2% by weight, of the more water-soluble monomers, such as vinyl acetate, acrylic amides, acrylic acids, and the like may be added to the more insoluble monomers and the polymerization conducted in the thickened aqueous medium containing an aqueous phase polymerization suppressant or inhibitor such as the salts of nitrobenzene sulfonic acids.

The preferred monomeric materials are vinyl chloride, the alkyl acrylates, such as ethyl acrylate, butyl acrylate, 2-ethylhexyl acrylate, and the like, and mixtures of these or with still other monomers, such as 2-chloroethyl vinyl ether; the alkyl alkacrylates, such as methyl methacrylate; styrene and nuclear-substituted halostyrenes; and acrylonitrile.

In the present invention the polymerization process may be carried out utilizing a full reactor technique. That is, the reacton vessel is completely filled with the polymerization medium and kept that way throughout the reaction by constant addition thereto of aqueous mucilage, as hereinbefore described, in the same proportion as at start-up. Upon the addition of a certain predetermined amount of aqueous mucilage, the polymerization reaction is terminated, usually by the addition thereto of a short-stopping agent. The necessity for the addition of aqueous mucilage is due to the shrinkage in volume of the reaction medium produced by the conversion of the monomer or monomers to the polymeric state.

To further illustrate the present invention, the following specific examples are given, it being understood that this is merely intended in an illustrative and not a limitative sense. In the examples all parts and percents are by weight unless otherwise indicated.

recipes employed are given in the following table in which all figures are parts by weight based on the weight of the monomer:

TABLE I

|  | Run #1 | Run #2 | Run #3 | Run #4 |
|---|---|---|---|---|
| Vinyl Chloride | 100 | 100 | 100 | 100 |
| Demineralized Water | 882 | 882 | 882 | 882 |
| 3% Mucilage of Ex. I.(pH 3.6) | 15.0 | 15.0 | 15.0 | 15.0 |
| [1]Pluronic L-61 (HLB = 3.0) | 0.5 | | | |
| Polyoxyethylene(2)Stearyl Ether (HLB = 4.9) | | 0.5 | | |
| Sorbitan Monolaurate (HLB = 8.6) | | | 0.5 | |
| Polyoxyethylene (1.5) Nonyl Phenol (HLB = 4.6) | | | | 0.5 |
| 5% NaOH Solution | 2.38 | 2.38 | 2.38 | 2.38 |
| Di-Secondary Butyl Peroxydicarbonate | 0.03 | 0.03 | 0.03 | 0.03 |

[1]A block copolymer consisting of propylene oxide and ethylene oxide units having the formula: $HO(C_2H_4O)_a(C_3H_6O)_b(C_2H_4O)_cH$ wherein $a + c = 4.4$ and $b = 30$.

EXAMPLE I

In this example, a regular quiescent polymerization was made without the nonionic surface active agent for purposes of comparison. The reaction medium was made by adding to 900 parts demineralized water, based on 100 parts of monomer to be polymerized, 35.5 parts of 0.06% by weight in water of a product which is the carboxylic form of a copolymer of the monomeric mixtures described herein containing anhydrous acrylic acid and a mixture of polyallyl ethers of sucrose containing an average of from about 3 to about 6 allyl ether groups per molecule. This mixture was agitated gently for 15 minutes and then neutralized with 5% aqueous NaOH to give a pH of 4.1. This medium is referred to as the mucilage. The medium was charged to a reactor and kept under an inert atmosphere of nitrogen. In a separate vessel there was mixed 0.03 part of a di-secondary butyl peroxydicarbonate catalyst with 100 parts of vinyl chloride at or about room temperature to insure against premature polymerization. The reactor was evacuated and the monomer-catalyst mixture added thereto with agitation in order to form the discrete droplets of monomer in the medium. The reactor was pressurized under 200 psig $N_2$ and heated to 57° C. The polymerization was stopped at 70% conversion. The polymer was recovered by passing the reaction medium through a suitable size screen. The polymer or PVC was in the form of "wrinkled" glass beads which were nonporous, such as shown in FIG. 1 of the drawing.

EXAMPLE II

In this example, a series of four runs were made using different surfactants having vary HLB values. The recipes employed are given in the following table in which all figures are parts by weight based on the weight of the monomer:

The procedure of Example I was used in making the polymers except that the surfactant in each run was premixed with the monomer-catalyst mixture prior to addition to the polymerization reactor. Further, a full reactor technique was employed by the addition of an aqueous 0.05% mucilage solution to the reactor until approximately 80% conversion of monomer to polymer had taken place. Thereafter the polymer was recovered by passing the reaction medium through a suitable size screen.

The following Table II summarizes the conditions of the polymerizations and the properties of the polymers produced:

TABLE II

| Run No. | pH. | HLB | Average Particle Size(μ) | Particle Size Distribution (%) | Porosity (cc/gm.) |
|---|---|---|---|---|---|
| 1 | 6.9 | 3.0 | 96.5 | 33.7 | 0.134 |
| 2 | 6.7 | 4.9 | 119.9 | 49.8 | 0.122 |
| 3 | 6.6 | 8.6 | 201.8 | 119.8 | 0.252 |
| 4 | 6.0 | 4.6 | 108.9 | 44.6 | 0.113 |

All of these polymers were of the spherical porous type shown in FIG. 3 of the drawing.

EXAMPLE III

In this example, a series of runs were made using different surfactants and particularly surfactant blends. The recipes are given in the following table in which all amounts are parts by weight based on the weight of the monomer.

TABLE III

|  | Control Run #5 | Run #6 | Run #7 | Run #8 | Run #9 | Run #10 | Run #11 |
|---|---|---|---|---|---|---|---|
| Vinyl Chloride | 100 | 100 | 100 | 100 | 100 | 100 | 100 |
| Demineralized Water | 900 | 882 | 891 | 891 | 879 | 882 | 879 |
| 3% Mucilage of Ex.I.(pH 3.6) | 0.542 | 15.0 | 7.5 | 7.5 | 18.0 | 15.0 | 18.0 |
| Sorbitan Monostearate | | 0.4 | | | | | |
| Sorbitan Monooleate | | | 0.6 | 0.10 | | | |
| 8% Sorbitan Monooleate 92% Sorbitan Trioleate | | | | | 0.6 | 0.6 | |
| 82% Sorbitan Monooleate 18% Polyoxyethylene(20) Sorbitan Monooleate | | | | | | | 0.6 |
| 5% NaOH | 0.0236 | 2.38 | 1.19 | 1.17 | 2.86 | 2.38 | 2.86 |
| Di-secondary Butyl Peroxydicarbonate | 0.03 | 0.03 | 0.03 | 0.03 | 0.03 | 0.03 | 0.03 |

The procedure of Example II was used in making the polymers. A full reactor technique was also employed, as in Example II, by the addition of an aqueous Carbopol 941 solution to the reactor until approximately 80% conversion of monomer to polymer had taken place. The following Table sets forth the properties of the polymers produced:

TABLE IV

| Run No. | HLB | Porosity | Average Particle Size | Particle Nature |
|---|---|---|---|---|
| 5-Control | — | Nil | 100μ | Transparent Glassy Beads, Irregular Surface Opaque |
| 6 | 4.7 | 0.218 | 135μ | Very Smooth Spheres |
| 7 | 4.3 | 0.246 | 114μ | Very Smooth Spheres |
| 8 | 4.3 | 0.150 | 143μ | Very Smooth Spheres |
| 9 | 2.0 | 0.170 | 167μ | Smooth Spheres |
| 10 | 2.0 | 0.200 | 160μ | Smooth Spheres |
| 11 | 6.0 | 0.190 | 121μ | Smooth Spheres |

From the above, it can readily be seen that the addition of a nonionic surfactant greatly improves the nature of the polymer particles. In addition to the polymer particles being spherical and porous, when low HLB surfactants are used at low concentrations, the particles are also smooth to very smooth.

EXAMPLE IV

In this Example, a further series of runs were made using different surfactants and surfactant blends having HLB's in the upper part of the range given herein. The recipes are given in the following Table in which all amounts are parts by weight, based on the weight of the monomer.

TABLE V

|  | Run #12 | Run #13 | Run #14 | Run #15 | Run #16 |
|---|---|---|---|---|---|
| Vinyl Chloride | 100 | 100 | 100 | 100 | 100 |
| Demineralized Water | 600 | 600 | 600 | 600 | 600 |
| Cross-linked polymer of Ex. I | 0.36 | 0.36 | 0.36 | 0.64 | 0.26 |
| (1)Igepal CO-430 | 0.5 |  |  |  |  |
| (2)Igepal CO-710 |  | 0.18 |  |  |  |
| (3)Igepal CO-880 |  |  | 0.5 |  |  |
| Igepal CO-880 |  |  |  | 0.16 | 0.16 |
| Igepal CO-430 |  |  |  | 0.50 | 0.25 |
| 25% NaOH | 0.033 | 0.033 | 0.033 | 0.024 | 0.033 |
| Di-secondary Butyl Peroxydicarbonate | 0.03 | 0.03 | 0.03 | 0.03 | 0.03 |

(1)Nonylphenoxypoly (4-ethyleneoxy)ethanol.
(2)Nonylphenoxypoly(10–11 ethyleneoxy)ethanol.
(3)Nonylphenoxypoly(30-ethyleneoxy)ethanol.
Note:
The Igepal ® Surfactants are made and sold by GAF Corp., Chemical Products.

The procedure of Example II was used in making the polymers. A full reactor technique was also employed, as in Example II, by the addition of an aqueous mucilage solution to the reaction mixture until approximately 80% conversion of monomer to polymer had taken place. The following Table sets forth the properties of the polymers produced:

TABLE VI

| Run No. | HLB | Average Particle Size (μ) | Particle Size Distribution (%) | Porosity (cc/gm.) | Average Pore Size (μ) | Pore Size Distribution (%) |
|---|---|---|---|---|---|---|
| 12 | 8.8 | 104.98 | 38.8 | 0.167 | 0.411 | 11.23 |
| 13 | 13.6 | 81.40 | 44.0 | 0.107 | 0.411 | 15.02 |
| 14 | 17.2 | 82.50 | 27.8 | 0.156 | 0.422 | 7.95 |
| 15 | 10.84 | 83.10 | 42.2 | 0.214 | 0.343 | 8.88 |
| 16 | 12.08 | 107.50 | 29.4 | 0.167 | 0.415 | 8.55 |

All of these polymers, even with the high HLB figures, were of the spherical, porous type shown in FIG. 3 of the drawing.

While the present invention has been described in terms of its specific embodiments, certain modifications and equivalents will be apparent to those skilled in the art and are intended to be included within the scope of the present invention, which is to be limited only by the scope of the appended claims.

We claim:

1. In a process for polymerizing one or more vinylidene monomers having a terminal $CH_2=C<$ grouping in the form of discrete droplets containing a monomer-soluble free radical-type catalyst while suspended in an aqueous mucilage having plastic flow properties, said droplets being polymerized while moving under plastic flow in the substantial absence of shear forces, and said mucilage comprising a water-insoluble, water-swellable lightly cross-linked polymer of one or more olefinically unsaturated carboxylic acid monomers containing sufficient water to form a flowable plastic mass, the improvement comprising conducting said polymerization in the presence of a nonionic surfactant having a Hydrophile-Lipophile Balance in the range of about 1 to about 17, thereby producing spherical beads of polymer having high porosity and high bulk density.

2. A process as defined in claim 1 wherein said cross-linked polymer is formed by polymerizing at least one carboxylic acid monomer selected from the group consisting of (1) those monomers having the formula:

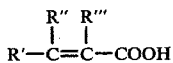

wherein R' is hydrogen or a COOH group, and each of R" and R''' is a hydrogen or a monovalent substituent group which is linked to one of the doubly bonded carbon atoms, and (2) those monomers having the formula:

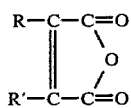

wherein R and R' are monovalent substituent groups selected from hydrogen, halogen, cyanogen ($—C\equiv N$) groups, alkyl, aryl, alkaryl, aralkyl, and cycloaliphatic radicals, in the presence of a cross-linking agent which contains a plurality of terminal polymerizable $CH_2=C<$ groups per molecule, said agent being selected from the group consisting of polyunsaturated hydrocarbons, -polyethers, -polyesters, -nitriles, -acids, -acid anhydrides, -ketones, -alcohols, and polyunsaturated compounds incorporating one or more of these functional groups.

3. A process as defined in claim 2 wherein the surfactant is sorbitan monolaurate.

4. A process as defined in claim 2 wherein the surfactant is sorbitan monooleate.

5. A process as defined in claim 2 wherein the surfactant is polyoxyethylene (1.5) nonyl phenol.

6. A process as defined in claim 2 wherein the surfactant is polyoxyethylene (2) stearyl ether.

7. A process as defined in claim 2 wherein the surfactant is a mixture of 8% sorbitan monooleate and 92% sorbitan trioleate.

8. A process as defined in claim 1 wherein said surfactant has a Hydrophile-Lipophile Balance in the range of about 1 to about 10.

9. A process as defined in claim 1 wherein said surfactant has a Hydrophile-Lipophile Balance in the range of about 2 to about 6.

10. A process as defined in claim 1 wherein the monomer is vinyl chloride.

11. A process as defined in claim 2 wherein the monomer is vinyl chloride.

12. A process as defined in claim 8 wherein the monomer is vinyl chloride.

13. A process as defined in claim 9 wherein the monomer is vinyl chloride.

14. A process as defined in claim 2 wherein said surfactant has a Hydrophile-Lipophile Balance in the range of 2 to 6.

15. A process as defined in claim 14 wherein the surfactant is sorbitan monolaurate.

16. A process as defined in claim 14 wherein the surfactant is a block copolymer consisting of propylene oxide and ethylene oxide units having the formula:

$$HO(C_2H_4O)_a(C_3H_6O)_b(C_2H_4O)_cH$$

wherein $a+c=4.4$ and $b=30$.

17. A process as defined in claim 14 wherein the surfactant is polyoxyethylene (2) stearyl ether.

18. A process as defined in claim 14 wherein the surfactant is sorbitan monostearate.

19. A process as defined in claim 14 wherein the surfactant is sorbitan monooleate.

20. A process as defined in claim 15 wherein the monomer is vinyl chloride.

21. A process as defined in claim 16 wherein the monomer is vinyl chloride.

22. A process as defined in claim 17 wherein the monomer is vinyl chloride.

23. A process as defined in claim 18 wherein the monomer is vinyl chloride.

24. A process as defined in claim 19 wherein the monomer is vinyl chloride.